United States Patent [19]

Andreas

[11] Patent Number: 4,628,361
[45] Date of Patent: Dec. 9, 1986

[54] VIDEO SYNCHRONIZING SIGNAL SEPARATOR

[75] Inventor: Sam Andreas, Brooklyn, N.Y.

[73] Assignee: Recoton Corporation, Long Island City, N.Y.

[21] Appl. No.: 689,645

[22] Filed: Jan. 8, 1985

[51] Int. Cl.[4] .............................................. H04N 5/08
[52] U.S. Cl. .................................. 358/153; 358/154; 358/31; 358/39
[58] Field of Search .................... 358/31, 39, 153, 154, 358/329

[56] References Cited

U.S. PATENT DOCUMENTS 4,379,309  4/1983  Berke et al. ........................ 358/153

FOREIGN PATENT DOCUMENTS 713921  8/1954  United Kingdom .

OTHER PUBLICATIONS

New Electronics; "Video-Sync. Separator"; by M. Bullough and E. F. Taylor, vol. 13, No. 2, Jan. 22, 1980, p. 28.

Primary Examiner—Tommy P. Chin
Assistant Examiner—Michael D. Parker
Attorney, Agent, or Firm—Curtis, Morris & Safford

[57] ABSTRACT

An improved video synchronizing signal separator for separating luminance and synchronizing signal components, respectively, from a composite video signal. Separate luminance and synchronizing channels are supplied with the composite video signal, each channel including a biased diode and an output attenuator. The diodes are poled in opposite directions to conduct when the particular threshold level established by the bias voltage applied thereto is exceeded. As an example, the diode in the luminance channel may be positively poled to conduct when the luminance signal component exceeds a positive threshold level and the diode in the synchronizing channel may be negatively poled to conduct when the synchronizing signal component exceeds a negative threshold level. The positive-going luminance signal component serves to cut off the diode in the synchronizing channel and the negative-going synchronizing signal component serves to cut off the diode in the luminance channel.

10 Claims, 1 Drawing Figure

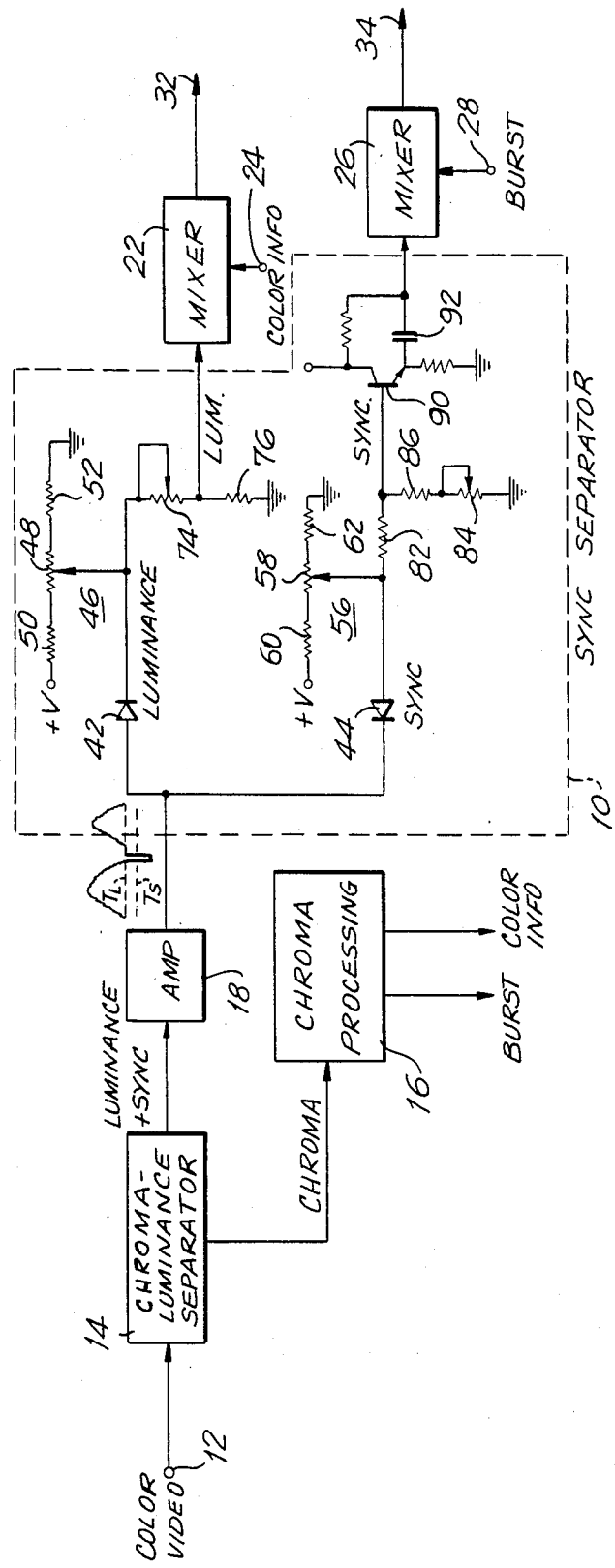

VIDEO SYNCHRONIZING SIGNAL SEPARATOR

BACKGROUND OF THE INVENTION

This invention relates to a video synchronizing signal separator and, more particularly, to a relatively simple yet effective separator circuit for separating the luminance and synchronizing signal components of a composite video signal.

In video signal processing circuits, such as those used in television receivers, video recorders, video signal enhancers, and the like, the usual periodic horizontal synchronizing signal that is included in the composite video signal is separated and separately processed. Desirably, the informational components of the composite video signal, such as the chrominance and luminance components, should not interfere with the separated synchronizing signal. Similarly, those informational components should be separately processed without interference from the synchronizing signal. Thus, synchronizing signal separator circuits have been developed for separating the horizontal synchronizing signal from the composite video signal.

Typical of horizontal synchronizing separator circuits heretofore used are the so-called "sync clipper" circuits formed of a diode connected in shunt with the video path, the diode being conductive to shunt the information components to ground yet being cut off in the presence of the horizontal synchronizing signal, thus passing the horizontal synchronizing signal to further circuitry. A similar diode has been used to clamp the informational components, and particularly the luminance signal, to a predetermined level, such as the black level. This clamping diode is conductive to shunt the synchronizing signal to ground.

Although the aforementioned sync clipper circuits have proven to be successful in operation and are relatively inexpensive, there have been proposals for more complicated sync processing circuits, such as described in U.S. Pat. Nos. 3,881,055, 4,057,826, 4,424,528 and 4,453,183.

It is desirable to provide a sync separator circuit of relatively simple and inexpensive construction, yet is reliable in separating the synchronizing signal component from its composite video signal.

OBJECTS OF THE INVENTION

Therefore, it is an object of the present invention to provide a relatively inexpensive and reliable synchronizing signal separator circuit.

Another object of this invention is to provide a sync separator for separating the horizontal synchronizing signal of a composite video signal to one channel and at least the luminance signal component to another channel.

A further object of this invention is to provide a sync signal separator that can be used with color or black-and-white television signals.

An additional object of this invention is to provide an improved synchronizing signal separator having two channels, one channel carrying only the synchronizing signal, to the exclusion of the luminance component of the composite video signal, and the other channel carrying only the luminance component, to the exclusion of the synchronizing signal.

Various other objects, advantages and features of the present invention will become readily apparent from the ensuing detailed description, and the novel features will be particularly pointed out in the appended claims.

SUMMARY OF THE INVENTION

In accordance with this invention, a synchronizing signal separator is provided for separating the luminance and synchronizing signal components from a composite video signal. Separate luminance and synchronizing channels are provided, the luminance channel including a diode biased for conduction in one direction and the synchronizing channel including a diode biased for conduction in the opposite direction, with the respective bias voltages establishing threshold voltages. As an example, the diode included in the luminance channel is cut off when the composite video signal is less than the positive threshold level determined by the bias voltage applied to that diode; and the diode included in the synchronizing channel is cut off when the composite video signal is less than the negative threshold level determined by the bias voltage supplied to that diode. Respective attenuators are included in each channel to adjust the amplitude of the luminance and synchronizing signal components that are passed by the respective diodes.

BRIEF DESCRIPTION OF THE DRAWING

The following detailed description, given by way of example and not intended to limit the present invention solely to the illustrated embodiment, may best be understood in conjunction with the accompanying drawing FIGURE which is a partial block, partial schematic diagram of a video signal processing circuit in which the present invention finds ready application.

Referring now to the drawing, the illustrated circuit may be used in a television receiver, a video recorder, a video disk player or, in general, a video processor. The illustrated processing circuitry includes a chrominance-luminance separator 14, a chrominance processing circuit 16, a synchronizing signal separator 10, a mixer 22, a mixer 26, and output terminals 32 and 34. Chrominance-luminance separator circuit 14 is coupled to an input terminal 12 and is adapted to separate the chrominance component from the luminance and synchronizing signal components normally included in a composite color video signal. Input terminal 12 is adapted to receive the composite color video signal or, alternatively, to receive a composite black-and-white signal. As is appreciated, a "composite" video signal includes both video information, comprised of the luminance component and the chrominance component, and synchronizing information comprised of the horizontal synchronizing signal. The composite video signal also includes, as is conventional, the vertical synchronizing signal. The chrominance-luminance separator circuit may be of conventional construction, such as a filter, and is adapted to supply to chrominance processing circuit 16 the chrominance component separated from the composite video signal, and to supply to synchronizing signal separator 10 the luminance and synchronizing signal components included in the composite video signal.

Chrominance processing circuit 16 may be of conventional construction and is adapted to separate and separately process, as by phase enhancement, amplitude adjustment, and the like, the usual color burst signal and the color information components normally considered to be a part of the chrominance component. The burst signal which is processed by chrominance processing circuit 16 is supplied, by way of terminal 28, to mixer 26 whereat the burst signal is combined, or mixed, with the horizontal synchronizing signal separated by sync separator circuit 10. Similarly, the color information components separated from the chrominance component by the chrominace processing circuit are supplied, by way of terminal 24, to mixer 22 whereat the color information components are combined, or mixed, with the luminance component separated from the composite video signal by the snyc separator circuit. Chrominance processing circuit 16 and mixers 22 and 26 are of conventional construction. Mixer 22 is coupled to output terminal 32 to supply the combined luminance and color information components, and mixer 26 is coupled to output terminal 34 to provide the combined horizontal synchronizing and burst signal components. An additional mixer circuit (not shown) may be coupled to output terminals 32 and 34 for the purpose of re-combining the horizontal synchronizing signal, the burst signal, the luminance signal and the color informational signals so as to re-form a composite color video signal. It is appreciated, however, that each of the aforementioned components included in the re-formed composite color video signal may be separately processed prior to the combination thereof, thus enhancing each component, as desired.

Synchronizing signal separator 10 is coupled by way of amplifier 18 to chrominance-luminance separator 14 to receive the combined luminance and horizontal synchronizing signal components included in the composite video signal. The purpose of the synchronizing signal separator is to separate the luminance component from the synchronizing signal component and to supply these separated components individually to mixers 22 and 26, respectively.

In the illustrated embodiment, synchronizing signal separator 10 is comprised of a luminance channel and a synchronizing channel to pass the luminance signal component and the synchronizing signal component, respectively. The luminance channel is comprised of a unilateral conducting device 42, such as a diode or diode-connected transistor, and a bias circuit 46. The bias circuit is coupled to the unilateral conducting device, referred to hereafter simply as the diode, to establish a threshold or turn-off level. If the amplitude of the positive-going composite video signal supplied to synchronizing signal separator 10 is less than this threshold or turn-off level, diode 42 is rendered non-conductive. Conversely, when the positive-going amplitude of the composite video signal exceeds the threshold or turn-off level established by bias circuit 46, diode 42 is rendered conductive.

In the illustrated embodiment, bias circuit 46 is comprised of a potentiometer 48, or other adjustable resistance, coupled across a suitable voltage source +V by means of resistors 50 and 52. The potentiometer is connected to the cathode of diode 42. This bias circuit establishes a positive threshold level which must be exceeded by the composite video signal in order to render diode 42 is conductive.

The synchronizing channel is comprised of a unilateral conducting device 44, such as a diode or a diode-connected transistor, and a bias circuit 56. The unilateral conducting device, referred to simply as a diode, is poled in a direction opposite to that of diode 42, and the anode of diode 42 is connected in common with the cathode of diode 44 to receive the composite video signal. Bias circuit 56 is coupled to the anode of diode 44 and is adapted to supply a bias voltage which establishes a threshold, or turn-off, level for the diode. In the illustrated embodiment, diode 44 may be thought of as being negatively poled and is rendered conductive when the threshold or turn-off level established by bias circuit 56 is exceeded. More particularly, when the amplitude of the negative-going portion of the composite video signal exceeds this threshold or turn-off level, diode 44 conducts. When the negative-going amplitude is less than this threshold level, the diode is rendered non-conductive.

Bias circuit 56 is similar to bias circuit 46 and is comprised of a potentiometer 58, or other adjustable resistance, connected across a voltage source +V by means of resistors 60 and 62. The voltage sources coupled to bias circuits 46 and 56 may be equal or, in the alternative, may be separate and distinct sources of operating potential. For example, the voltage source to which bias circuit 56 is coupled may be a negative DC voltage and the voltage source to which bias circuit 46 is coupled may be a positive DC voltage.

The luminance channel includes a luminance output circuit comprised of an adjustable attenuator 74 coupled to ground (or another reference potential) by way of a resistor 76. Attenuator 74 is coupled to receive the luminance signal component that flows through diode 42; and the junction defined by this attenuator and resistor 76 is coupled to mixer 22 to supply an attenuated luminance signal component thereto.

Similarly, the synchronizing channel includes a synchronizing signal output circuit comprised of an adjustable attenuator 84 that is connected by way of resistor 86 in a shunt path to the separated synchronizing signal component. A resistor 82 couples the synchronizing signal component which flows through diode 44 to this shunt path, and the junction defined by resistor 82 and the shunt path is connected, by way of an emitter-follower transistor 90 and a coupling capacitor 92, to mixer 26. Attenuators 74 and 84 are adjustable to selectively attenuate the amplitudes of the luminance and synchronizing signal components, respectively, as desired. It is appreciated that each attenuator may comprise an adjustable potentiometer.

In operation, let it be assumed that chrominance-luminance separator 14 supplies the composite video signal represented by the illustrated waveform to the common terminal to which the luminance and synchronizing channels are connected. It is assumed that the luminance signal component is relatively positive (or positive-going) and the synchronizing signal component is relatively negative (or negative-going), as shown. Bias circuit 46 connected to the cathode of diode 42 establishes threshold level $T_L$ and bias circuit 56 connected to the anode of diode 44 establishes threshold level $T_S$. When the amplitude of the composite video signal is positive and exceeds threshold level $T_L$, diode 42 is rendered conductive. At this time, however, diode 44 is seen to be back biased by the positive amplitude of the composite video signal and is rendered non-conductive. The threshold level $T_L$ may be equal to the bias voltage derived from bias circuit 46 plus the inherent $V_{be}$ voltage across diode 42. Preferably, the threshold level $T_L$ is clamped to the black level.

As the amplitude of the composite video signal decreases, the conductivity of diode 42 correspondingly decreases. Eventually, when the amplitude of the composite video signal falls below the threshold level $T_L$, diode 42 is rendered non-conductive, that is, it is cut off.

It is appreciated that, during the synchronizing signal interval of the composite video waveform, the negative-going synchronizing pulse exceeds the threshold level $T_S$ established by bias circuit 56. This threshold level $T_S$ may be substantially equal to the bias voltage derived from bias circuit 56 plus the inherent $V_{be}$ voltage across diode 44. When the negative-going portion of the composite video signal exceeds the threshold level $T_S$, diode 44 is rendered conductive. It is appreciated that, at this time, diode 42 is back biased and is non-conductive. Accordingly, diode 44 conducts substantially throughout the horizontal synchronizing pulse duration; and when the composite video signal once again crosses the threshold level $T_S$ in the positive direction, diode 44 is turned off.

The luminance signal component which flows through diode 42 while that diode is rendered conductive, that is, for the duration that the positive portion of the composite video signal exceeds threshold level $T_L$, is attenuated by attenuator 74, and the attenuated luminance component is supplied to mixer 22 substantially free of the synchronizing signal component. Similarly, the synchronizing signal component which flows through diode 44 during the interval that the negative portion of the composite video signal exceeds threshold level $T_S$ is attenuated by attenuator 84, and the attenuated synchronizing signal component is supplied by way of emitter-follower 90 to mixer 26 substantially free of the luminance signal component. Since the video information portion, or luminance information component, does not coincide in time with the negative-going horizontal synchronizing pulse, diodes 42 and 44 are rendered conductive mutually exclusively. Bias circuits 46 and 56 serve to make certain that the positive-going luminance information component passes through diode 42 to the exclusion of the negative-going horizontal synchronizing pulse, and that the negative-going horizontal synchronizing pulse passes through diode 44 to the exclusion of the positive-going luminance information component.

While the present invention has been particularly shown and described with reference to a preferred embodiment, it will be readily appreciated by those of ordinary skill in the art that various changes and modifications may be made. For example, in the event that the luminance information component is a negative-going signal and the horizontal synchronizing pulse is a positive-going pulse, the poling of diodes 42 and 44 may be reversed. Nevertheless, the diode included in the luminance channel is conductive during the luminance signal interval and is biased to non-conduction in response to the horizontal synchronizing signal component; and the diode included in the synchronizing channel is conductive during the synchronizing signal interval and is biased to non-conduction in response to the luminance signal component.

It is intended that the appended claims be interpreted as covering not only the illustrated embodiment but those variations and modifications mentioned above. It is recognized that the synchronizing signal separator circuit need not be limited solely to two-terminal diode devices but, rather, may cover diode-connected transistors or other known uni-directional conducting circuit elements.

What is claimed is:

1. A synchronizing signal separator for separating the luminance and synchronizing signal components from a composite video signal supplied thereto, comprising: first and second oppositely conductive diodes having an anode of one and a cathode of the other coupled to a common terminal to receive said composite video signal; first and second bias means coupled to said first and second diodes, respectively, to establish respective turn-off levels for said first and second diodes to render said respective first and second diodes non-conductive when said composite video signal crosses respective threshold voltage levels, at least one of said bias means including a source of voltage; adjustable resistance means coupled to said source of voltage to produce an adjustable bias voltage; means for applying said adjustable bias voltage to the cathode of said first diode; luminance output means comprising first variable attenuating means coupled to the cathode of said first diode for attenuating by a selected amount said luminance signal component to supply a luminance signal component substantially free of said synchronizing signal component; and synchronizing output means coupled to said second diode to supply a synchronizing signal component substantially free of said luminance signal component; whereby said first diode is conductive during the luminance signal interval of said composite video signal and is biased to non-conduction in response to said synchronizing signal component of said composite video signal, and said second diode is conductive during the synchronizing signal interval of said composite video signal and is biased to non-conduction in response to said luminance signal component of said composite video signal.

2. The invention of claim 1 wherein said first variable attenuating means comprises an adjustable potentiometer.

3. The invention of claim 1 wherein said synchronizing output means comprises an emitter-follower transistor coupled to the anode of said second diode.

4. The invention of claim 3 wherein said synchronizing output means further comprises second variable attenuating means coupled to the base of said emitter-follower transistor for attenuating by a selected amount the synchronizing signal component applied to said emitter-follower transistor.

5. The invention of claim 4 wherein said second variable attenuating means comprises an adjustable potentiometer.

6. A synchronizing signal separator for separating the luminance and synchronizing signal components from a composite video signal supplied thereto, comprising: luminance and synchronizing channels coupled to a common terminal for receiving the composite video signal, and for supplying the luminance signal component and the synchronizing signal component, respectively, the luminance channel including:
first diode means poled for conduction in a first direction when the composite video signal exceed a first threshold level, said first diode means being non-conductive when the composite video signal is less than said first threshold level;
a first bias circuit coupled to said first diode means to establish said first threshold level, said first bias circuit including a first source of voltage; first adjustable resistance means coupled to said first source of voltage to produce a first adjustable bias voltage; and means for applying said first adjustable bias voltage to said first diode means; and
first variable attenuating means coupled to said first diode means for attenuating by a selectable amount the amplitude of the luminance signal component that flows through said first diode means;

the synchronizing channel including:
- second diode means poled for conduction in a second direction when the composite video signal exceeds a second threshold level, said second diode means being non-conductive when the composite video signal is less than said second threshold level;
- a second bias circuit coupled to said second diode means to establish said second threshold level, said second bias circuit including a second source of voltage; second adjustable resistance means coupled to said second source of voltage to produce a second adjustable bias voltage; and means for applying said second adjustable bias voltage to said second diode means; and
- second variable attenuating means coupled to said second diode means for attenuating by a selectable amount the amplitude of the synchronizing signal component that flows through said second diode means.

7. The invention of claim 6 wherein said luminance signal component exhibits relatively positive polarity and said synchronizing signal component exhibits relatively negative polarity; and wherein said first diode means is poled to conduct when the composite video signal is of a positive polarity in excess of said first threshold level, and said second diode means is poled to conduct when the composite video signal is of a negative polarity in excess of said second threshold level.

8. The invention of claim 7 wherein said first diode means is connected in series in said luminance channel and said first bias circuit is coupled to the cathode of said first diode means; and wherein said second diode means is connected in series in said synchronizing channel and said second bias circuit is coupled to the anode of said second diode means.

9. The invention of claim 6 wherein said first and second voltage sources are equal.

10. The invention of claim 6 wherein said synchronizing channel further includes an emitter-follower transistor coupled to receive the attenuated synchronizing signal component.

* * * * *